United States Patent
Büttiker et al.

(10) Patent No.: US 8,758,492 B2
(45) Date of Patent: Jun. 24, 2014

(54) SONOTRODE AND DEVICE FOR REDUCING AND ELIMINATING FOAMING OF LIQUID PRODUCTS

(71) Applicants: Telsonic Holding AG, Bronscchofen (CH); Cavitus Pty Ltd, North Sydney (AU)

(72) Inventors: Albert Büttiker, Kirchberg (CH); Holger Keller, St. Gallen (CH); Darren Bates, Twin Waters (AU)

(73) Assignees: Telsonic Holding AG, Bronschhofen (CH); Cavitus Pty Ltd, North Sydney (AU)

(*) Notice: Subject to any disclaimer, the term of this patent is extended or adjusted under 35 U.S.C. 154(b) by 0 days.

(21) Appl. No.: 13/675,638

(22) Filed: Nov. 13, 2012

(65) Prior Publication Data

US 2014/0000460 A1  Jan. 2, 2014

Related U.S. Application Data

(60) Provisional application No. 61/611,596, filed on Mar. 16, 2012.

(30) Foreign Application Priority Data

Nov. 14, 2011 (EP) .................................. 11 189 063

(51) Int. Cl.
*B01D 19/00* (2006.01)
(52) U.S. Cl.
USPC .............................................. 96/175; 95/30
(58) Field of Classification Search
USPC .............................................. 95/30; 96/175
See application file for complete search history.

(56) References Cited

U.S. PATENT DOCUMENTS

| | | | | |
|---|---|---|---|---|
| 4,295,502 A * | 10/1981 | Matzner | ........................... | 95/30 |
| 4,339,247 A * | 7/1982 | Faulkner et al. | ................... | 95/30 |
| 8,128,730 B2 * | 3/2012 | Williamson | ...................... | 95/30 |
| 2001/0032511 A1 * | 10/2001 | Nagai et al. | ...................... | 73/618 |
| 2005/0115405 A1 * | 6/2005 | Yamada | ........................... | 95/30 |
| 2009/0137941 A1 * | 5/2009 | Lynch et al. | ................. | 604/6.11 |
| 2009/0277533 A1 * | 11/2009 | Williamson | .................... | 141/11 |

FOREIGN PATENT DOCUMENTS

| | | | |
|---|---|---|---|
| JP | 7-291395 | | 11/1995 |
| JP | 7291395 | * | 11/1995 |
| JP | 8-192123 | | 7/1996 |
| JP | 8192123 | * | 7/1996 |
| WO | WO2004/024317 | | 3/2004 |
| WO | WO2004/024317 A1 | * | 3/2004 |
| WO | WO2007/118285 | | 10/2007 |
| WO | WO2007/118285 A1 | * | 10/2007 |

* cited by examiner

*Primary Examiner* — Duane Smith
*Assistant Examiner* — Douglas Theisen
(74) *Attorney, Agent, or Firm* — Henry M Feiereisen LLC

(57) ABSTRACT

A Sonotrode for generating an ultrasonic field in industrial production processes such as chemical, food, petroleum, pharmaceutical, beverage or mining-related processes for reducing and eliminating foaming of liquid products has a compact one-piece form, wherein the sonotrode is provided with a main body part having a connector for connection with a high frequency generator and having a front face from which the ultrasonic field is directed to the desired spot or area of the product to be de-foamed, wherein the main body part has the shape of a compact block element and in that the front face is concave in shape in relation to a product surface such that the ultrasonic field is focused and directed to a specific area of a product foam to be treated in a concentrated form compared to a non-focused ultrasound.

19 Claims, 3 Drawing Sheets

SONOTRODE AND DEVICE FOR REDUCING AND ELIMINATING FOAMING OF LIQUID PRODUCTS

CROSS-REFERENCES TO RELATED APPLICATIONS

This application claims the priority of European Patent Application, Serial No. 11 189 063.8-1240, filed Nov. 14, 2011, pursuant to 35 U.S.C. 119(a)-(d), the disclosure of which is incorporated herein by reference.

This application claims the benefit of prior filed U.S. provisional Application No. 61/611,596, filed Mar. 16, 2012, pursuant to 35 U.S.C. 119(e), the disclosure of which is incorporated herein by reference.

BACKGROUND OF THE INVENTION

The present invention relates to a sonotrode for generating an ultrasonic field in industrial production processes such as chemical processes or food-related processes, in which a liquid product is processed, which generates during the processing a foaming on the upper surface of the product. The invention relates also to a device comprising one or more such sonotrodes for de-foaming.

The following discussion of related art is provided to assist the reader in understanding the advantages of the invention, and is not to be construed as an admission that this related art is prior art to this invention.

In different fields of industry, the foam generation of a product to be processed is an inherent problem. In the field of beverage industry, for example, mainly with carbonated products such as cola and beer, but also with non-carbonated products such as fruit juices, etc., there exists during the production process, but also during the filling of the product into bottles or the like the problem that the product generates a large amount of foam. The generation of foam results often in an undesired loss of product, and also the contamination of the containers, into which the product is to be filled, is a big problem in these industries. During the filling process, the generation of too much foam leads to problems with regard to the sealing of the containers, and furthermore the filling line process is considerably slowed down due to the foam on top of the product. However, also in other industries, the foam generation of liquid products is a problematic issue. Examples of other industries are the chemical, petroleum, pharmaceutical and mining industries. Foam can form in tanks, open vessels or in containers or bottles, into which the product is filled. Due to the foam, there exists also a problem with regard to the vessel capacity/volume, the downstream processing equipment such as pumps, homogenizers, pasteurizers, filling lines and the filtration equipment.

In the prior art, conventional technologies used to reduce or to act against the generation of too much foam have for several years involved the use of anti-foam chemicals. However, in the food industry, the use of chemicals is not possible, and in other industries the use of such chemicals for reducing the generation of foam is rather cost-intensive. Also, the chemicals may change the characteristics of the liquid product, which is processed in the production line.

Furthermore, mechanical foam breakers have been suggested in the prior art in order to limit the generation of foam during the filling of beer or cola into bottles, for example. A further solution to this type of problem consists in anti-foam devices using ultrasound waves for the destruction of foam on top of the liquid product. In WO 2004/024317 A1, for example, an ultrasonic device is disclosed for eliminating the creation of foam in large containers. This known device uses round, plate-shaped resonators mounted on a rotating device and being provided with means for changing the angle of the treatment surface of the resonator plates of this device in the direction of the product. Through the change of the angle of the plate-shaped resonators and the rotation of the two devices, the ultrasonic field is focused on a specific spot on the surface of the product container. This system is rather big in its construction and difficult to be implemented in existing filling lines without substantial modifications. Furthermore, this known ultrasonic device needs complicated means for controlling the creation of the ultrasonic field and for permanent modifying the angle of radiation of the focused ultrasonic field.

In WO 2007/118285 A1, a further ultrasonic transducer system is disclosed, having a sonotrode with a main body part and a liquid treatment surface on its end. The foam treatment surface of this sonotrode is provided with a plurality of horn-shaped cavities. Due to the plurality of cavities, a more intensive ultrasonic field may be emitted. However, also this type of an ultrasonic treatment device has disadvantages in terms of the possibility to eliminate the generation of foam in certain applications, e.g. in filling lines for filling beverages into bottles or containers.

It would therefore be desirable and advantageous to provide a sonotrode and an ultrasonic device with at least one sonotrode, which are more efficient and more flexible with respect to the application in existing production lines and with respect to the foam elimination and foam reduction in different production processes.

SUMMARY OF THE INVENTION

The sonotrode according to the invention is provided with a main body part having connecting means for the connection of the sonotrode with a high-frequency generator, and has a front face, from which the ultrasonic field is directed to the desired spot or area of the product or on top of the product to be de-foamed. The sonotrode according to the invention is characterized in that the main body part has a shape of a compact block element, and that the front face is concave in shape in relation to a product surface such that the ultrasonic field is focused and directed to a specific area of a product foam to be treated in a concentrated form compared to a non-focused ultrasound. As a result of the concave form of the front face, the ultrasonic field is concentrated compared to a flat or a convex front face, The concavity of the front face according to the invention is formed such that an increased effect for the de-foaming of a liquid product is achieved. The concave front face of the sonotrode according to the invention may in particular be formed like a rounded groove or channel with an especially optimized curvature. The ultrasonic high-amplitude frequency, which is introduced into the sonotrode by means of a connecting part, is effectively transmitted by the block-shaped main body part to the concave front face such that the generation of foam during the processing of the liquid product can be effectively eliminated and reduced.

According to an advantageous form of realization of the invention, the sonotrode is provided with a high power output, in particular with an ultrasonic power output into air of between 1 and 10,000 watts, between 2 and 1000 watts, preferably 5 to 1 to 800 watts, more preferably 10 to 700 watts, and even more preferably between 20 to 600 watts.

According to an advantageous form of realization of the invention, the sonotrode is provided with a high-amplitude ratio, in particular with an ultrasonic amplitude of peak-to-peak displacement between 1 and 150 microns, preferably 5 to 140 microns, more preferably 10 to 120 microns, and even more preferably 30 to 120 microns. Through extensive search, the inventors have found out that with these ranges of a high-amplitude ratio a highly effective foam destruction and reduction is possible. Surprisingly, these high-frequency ratios have turned out to be most effective for the purpose of de-foaming liquid products.

According to a further advantageous form of realization of the invention, the main body part is of a rectangular block-like shape having a reduced diameter part on the side of the front face, which is enlarged compared to the latter. This means, the sonotrode has in its upper region a block-shaped part of a compact form with the means for connecting the sonotrode to a high-frequency generator. However, in the lower part, i.e. the part closer to the front face, which is provided for directing the ultrasonic field on the foam of the product, there is provided an area of reduced diameter, so that the sonotrode has a cross-sectional tree-like form. This form is most effective for creating a high-frequency ultrasonic field with a compact and—from a first point of view—rather simply formed sonotrode. It has shown that the enlarged portion of the front face with a reduced diameter part between the block-like body part and the front face is excellent for transmitting a large amount of high-frequency ultrasonic beams onto the product to be treated. Therefore, the de-foaming effect is considerably increased by means of this type of sonotrode according to the invention.

According to a further advantageous form of realization of the invention, between the main body part and the front face of the sonotrode for generating the focused ultrasonic field of a high amplitude, a neck-like portion with round lateral indentations along a longitudinal axis L of the concave front face is provided, which has a longitudinal axis L, which is approximately perpendicular to a longitudinal axis S of the sonotrode itself.

According to a further advantageous form of realization of the invention, the sonotrode device improves the impedance matching with air and as a result improves the ultrasonic energy output efficiency and penetration distance through the air with sufficient energy to collapse foam at the following distances away from the emitting surface of the front face of the sonotrode: 0.1 mm to 1000 mm, preferably 0.2 mm to 500 mm, more preferably between 1 mm and 250 mm and most preferably between 10 mm and 100 mm.

According to a further advantageous form of realization of the invention, the sonotrode device is of such a form and size that it could be incorporated into a pipe, open trough, closed or open tank, vessel, container (made of steel, plastic, glass, metal) containing a flow-able material of foam, or foam and liquid or foam, liquid and solids and the ultrasonic and in a way that energy emitted from the sonotrode surface or concave front face would break the foam passing through.

According to a further preferred form of realization of the invention, the front face of the sonotrode has a rectangular form with a round concavity in the longitudinal direction L.

According to a further advantageous form of realization of the invention, the sonotrode has a concavity at its front face, which is formed like a segment of a circle with a radius of 2 cm or more.

The sonotrode according to the invention is preferably made of a metal material, such as steel, for example stainless steel, aluminum, nickel, titanium or alloys of these types of materials. The best de-foaming results have been achieved with a sonotrode made out of a material that has a high degree of tensile strength elastic force (e.g. titanium alloy).

According to a further advantageous form of realization of the invention, the form and construction of the block-type sonotrode is such that the ultrasonic sound intensity is between 10 to 200 db, preferably 50 to 190 db, more preferably 70 to 180 db, and most preferably 100 to 175 db. These values of ultrasonic sound intensity have shown very good results in the de-foaming of very different types of liquid products such as beverages (cola, diet cola, diet carbonated fruit drinks, sugar based carbonated fruit drinks, none carbonated fruit drinks, ginger beer, root beer, dairy products, dairy/fruit drinks, beer, all carbonated drinks, none carbonated drinks, fermentation broths, dairy protein based fluids, soy protein based fluids, whey protein based fluids, oil based fluids, etc.) as well as chemical or pharmaceutical products.

According to a further advantageous feature of the sonotrode according to the invention, the block-shaped main body part is provided with a circular central connection portion for connecting to an ultrasonic generator. Through this constructive measure, the block element of the sonotrode is on its upper surface formed with a disk-like central connecting part, which has turned out to be very effective for the introduction and distribution of the high-amplitude ultrasonic field from the high-frequency generator to the front face, which emits the high-frequency ultrasound to the product surface to be treated.

The present invention is also directed to a device for de-foaming liquid products in industrial production processes, such as chemical, pharmaceutical or beverage-related processes, which includes an ultrasonic generator, a converter with a cooling unit and at least one high-frequency cable for connecting one or more sonotrodes to the generator. According to the invention, the device is characterized in that it is provided with at least one block-shaped high-amplitude ratio sonotrode according to any forms of realization described above.

According to a preferred form of realization the device is provided with two sonotrodes mounted on a common mother sonotrode such that both longitudinal axes L of the front faces are essentially parallel to one another. By means of this the de-foaming effect is increased and a larger area of product can be treated at the same time.

According to one further aspect of the de-foaming device according to the invention the sonotrodes are arranged with their front faces in line with a transport direction of a production line of the product to be treated. That means the longitudinal axis of the front faces are in the same direction as the transport of product or bottles in the production line. A rather long ultrasonic field is emitted though this measure.

Alternatively, the sonotrodes are arranged with their front faces in an angle with respect to a transport direction of a production line of the product to be treated. Preferably the angle between the longitudinal axis L and the direction of product process may be $\alpha=90°$ or more preferably $\alpha=45°$. With this kind of a lateral acting of the ultrasonic field to the product surface in some specific applications the treatment has surprisingly been shown to be more effective.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
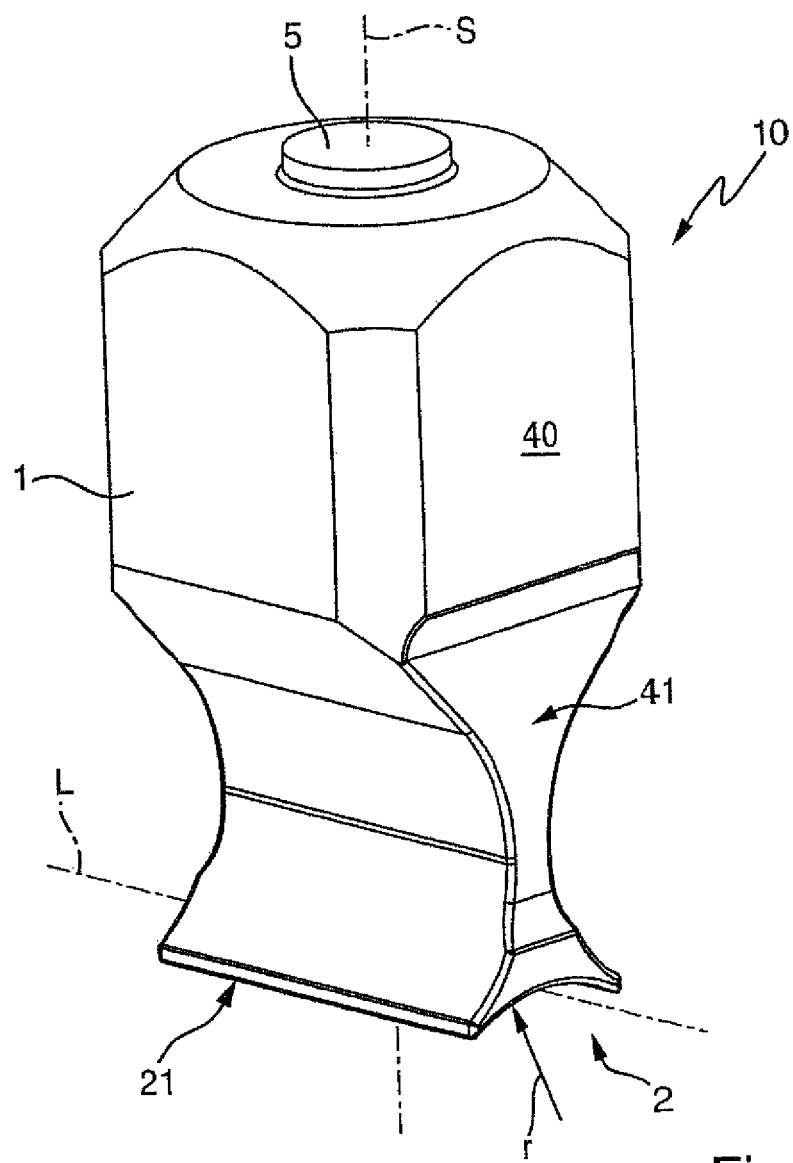
FIG. 1 is a perspective view of a first example of realization of the inventive sonotrode.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first example of realization of a sonotrode according to the invention in a perspective view. The sonotrode 10 includes in general two different parts: first, on the upper side, there is provided a main body part 1, and second, on the lower part, which is also the part being directed to the liquid product to be treated, there is a front face 2, which according to the invention has a concavity in the direction of the product (bottom part in FIG. 1). Here, the main body part 1 has the rectangular or square form of a compact block-like element 40. At the upper end of the main body part 1, the sonotrode 10 according to this example of realization is provided with a circular central connection portion 5, which has the form of a disk-shaped part made of the same material and in one piece with the sonotrode 10. In this example of realization, the upper edges of the main body part 1 are slightly rounded, and the lateral edges are chamfered. In the lower half of the sonotrode 10, there is provided a reduced diameter part 41, which in a cross-sectional view has a Y-like form with rounded lateral indentations and which is enlarged to the bottom end of the sonotrode 10 in order to form a rectangular front face 2 having a concavity 21 in the direction of the product to be treated. The concavity 21 has a longitudinal axis L, which is perpendicular to the overall longitudinal axis S of the sonotrode 10 and its main body part 1.

The concave front face 2 being connected to the main body part 1 through the reduced diameter part 41 results in an excellent transmission of high-amplitude ratio ultrasonic frequencies from the ultrasound generator to the front face 2, from which the ultrasonic field is to be emitted in a focused manner onto the foam of a product, which forms, for example, on the upper surface of a liquid product in a production vessel.

The concavity of the front face 2 is formed preferably with a radius of r=2 cm or more. The focusing of the ultrasonic field is hereby optimized in view of the de-foaming purpose of liquid products. With the concave form of the front face 2 a more focused and thereby more concentrated ultrasound is created. This increases the effect of eliminating the foam generation. According to advantageous embodiment of the inventive sonotrode is provided with a high amplitude ratio, in particular with an ultrasonic amplitude of peak to peak displacement between 1 and 150 microns, preferably 5 to 140 microns, more preferably 10 to 120 microns and more preferably 30 to 120 microns. These values are best for foam eliminating in most liquid products, in particular beverages such as cola or beer.

The form and construction of the sonotrode (10) according to the invention is such that the ultrasonic sound intensity is approximately between 10 to 200 db, preferably 50 to 190 db, more preferably 70 to 180 db and most preferably 100 to 175 db. With these ranges of intensity the sonotrode 10 achieves best results and the generation of foam is prevented.

Figure 2A:
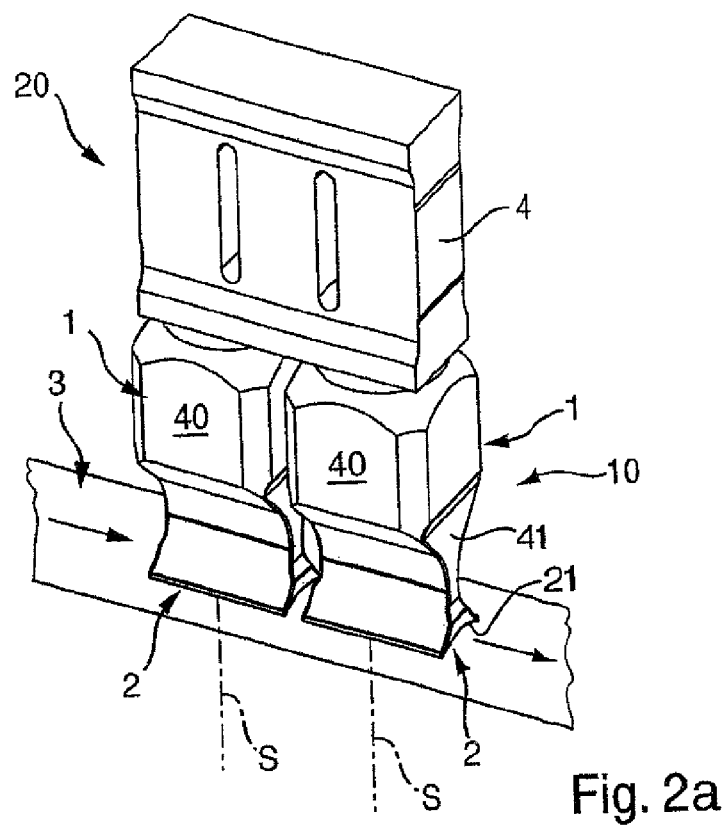
FIG. 2a is a perspective view of an example of realization of a sonotrode device according to the invention with two sonotrodes in line with the product process.
Figure 2B:
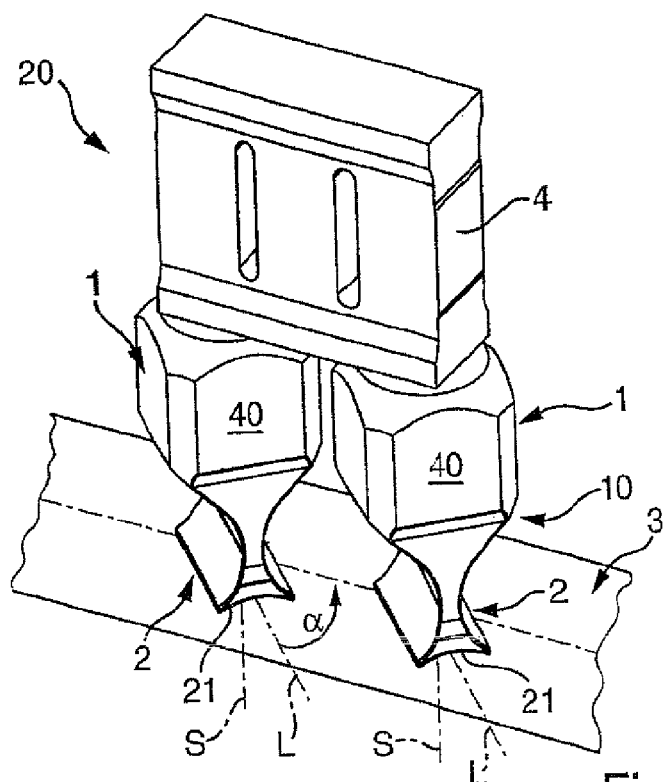
FIG. 2b is a perspective view of an example of realization of a sonotrode device according to the invention with two sonotrodes arranged in an angle compared to the product process.
Figure 2C:
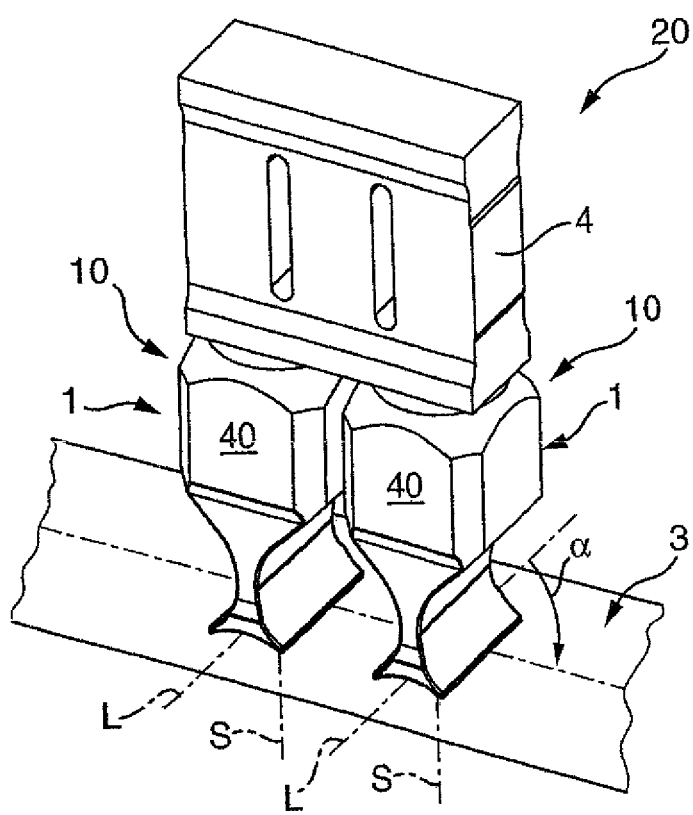
FIG. 2c is a perspective view of a further example of realization of a sonotrode device according to the invention with two sonotrodes in an angle of 90° in relation to the product process.

In FIGS. 2a to 2c three different examples of realization of a sonotrode device according to the invention with two combined sonotrodes are shown. These devices 20 have each two sonotrodes 10 mounted on a common mother sonotrode 4 or common base element. The mother sonotrode 4 is connected to a high frequency cable and ultrasound generator (not shown) and transfers the frequency directly to the both sonotrodes 10. These sonotrodes 10 are essentially of the same shape and have the same characteristics as the form of realization described in connection with FIG. 1.

The mother sonotrode 4 in the examples of realization (FIGS. 2a to 2c) is a rectangular block element with an I-type cross-section, i.e. enlarged end portions and a reduced diameter in the middle section. The middle section of the mother sonotrode 4 is here provided with two longitudinal through-holes in order to reduce the weight and to increase the transfer of ultrasound to the two sonotrodes 10. Both sonotrodes 10 are actuated thereby with the same and increased amount of ultrasound.

FIG. 2a shows an example of realization in which the longitudinal axis L of the sonotrodes 10 are in line or parallel to the transport direction of the production line of the product to be treated (cf. arrows in FIG. 2a).

In FIG. 2b, a similar ultrasonic device 20 is shown with the difference that the two parallel sonotrodes 10 are not in line with the transport direction of the product 3 but are turned in an angle of approximately 45° (angle α=45°). In some application areas this arrangement has resulted in much better results.

The further example of realization according to FIG. 2c shows both sonotrodes 10 being at an angle of 90° relative to the direction of transport of the product 3 or bottles. By means of this the width of the ultrasonic concentrated field is increased. The number of sonotrodes can be increased and be more than two. Furthermore, the form of the sonotrodes 10 and mother-sonotrode 4 may be changed as long as the front faces 2 of the sonotrodes 10 are provided with a concavity increasing the focusing effect as specified in the appended claims.

The product 3 or liquid to be de-foamed by the sonotrode 10 or device 20 according to the invention may be in a vessel, container etc. (in FIGS. 2a to 2c only schematically indicated). Or the product is filled in a filling line into separate bottles or the like. The inventive sonotrode and device is especially adapted for both applications due to its new sonotrode design and highly focused ultrasound field. The flexibility and variation of application areas is therefore largely increased for very different industrial production processes regarding foam creating liquids While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A sonotrode for generating an ultrasonic field in industrial production processes to eliminate foaming of a liquid product, comprising:
   a main body part shaped as a compact block element and having connecting means for connection with a high frequency generator; and
   a concave front face constructed to focus and direct the ultrasonic field to a desired spot or area of the product or to a foam of the product.

2. The sonotrode of claim 1, wherein the sonotrode is provided with a high amplitude ratio.

3. The sonotrode of claim 2, wherein the sonotrode is provided with an ultrasonic amplitude of peak to peak displacement between 1 and 150 microns.

4. The sonotrode of claim 2, wherein the sonotrode is provided with an ultrasonic amplitude of peak to peak displacement between 5 to 140 microns.

5. The sonotrode of claim 2, wherein the sonotrode is provided with an ultrasonic amplitude of peak to peak displacement between 10 to 120 microns.

6. The sonotrode of claim 2, wherein the sonotrode is provided with an ultrasonic amplitude of peak to peak displacement between 30 to 120 microns.

7. The sonotrode of claim 1, wherein said main body part is shaped as a rectangular block, said sonotrode further comprising a portion between the main body part and the front face having a diameter which is smaller than a diameter of the main body part and a diameter of the front face.

8. The sonotrode of claim 7, wherein the portion between the main body part and the front face has round lateral indentations along a longitudinal axis of the front face, said longitudinal axis being approximately perpendicular to a longitudinal axis of the sonotrode.

9. The sonotrode of claim 8, wherein the front face has a rectangular shape and a round concavity in a direction of the longitudinal axis of the front face.

10. The sonotrode of claim 9, wherein the concavity of the front face is shaped as a segment of a circle having a radius of at least 2 cm.

11. The sonotrode of claim 1, wherein the sonotrode is made of a member selected from the group consisting of steel, aluminum, nickel and titanium or alloys of the member.

12. The sonotrode of claim 1, wherein the main body part and the front face are formed in a one-piece body made of a same material.

13. The sonotrode of claim 12, wherein the material is titanium or an alloy including titanium.

14. The sonotrode of claim 1, wherein the sonotrode is of a shape and construction such that an ultrasonic sound intensity emitted by the sonotrode is between 10 to 200 db.

15. The sonotrode of claim 1, wherein the connector has a circular shape and is provided in a center of the block-shaped main body, and wherein the high frequency generator is an ultrasonic generator.

16. A device for de-foaming liquid products in industrial production processes comprising:
   an ultrasound generator;
   a converter including a cooling unit;
   at least one high frequency cable for connecting a sonotrode to the generator; and
   at least one block-shaped high amplitude ratio sonotrode for generating an ultrasonic field, said sonotrode comprising a main body part shaped as a compact block element and having connection means for connection with a high frequency generator, and a concave front face constructed to focus and direct the ultrasonic field to a desired spot or area of the product or to a foam of the product.

17. The device of claim 16, further comprising a mother sonotrode and at least two of said high amplitude ratio sonotrode, said at least two sonotrodes being mounted on the mother sonotrode such that respective longitudinal axes of the front face of each said at least two sonotrodes are parallel to one another and respective ultrasonic fields generated by the at least two sonotrodes are combined in an area of the product to increase a de-foaming effect.

18. The device of claim 17, wherein the at least two sonotrodes are arranged so that a distance between an ultrasound emitting surface of the front face of each of the at least two sonotrodes and the product is 0.1 mm to 1000 mm.

19. The device of claim 16, wherein the at least one sonotrode is shaped and sized so as to be incorporporable into a member selected from the group consisting of a pipe, an open trough, a closed tank, an open tank, a vessel, and a container so that ultrasonic energy emitted from the front face of the at least one sonotrode directly breaks foam formed on, in or by one of a flow-able material of foam, a combination of foam and liquid, and a combination of foam, liquid and solids passing through the member.

* * * * *